(12) United States Patent
Bennett

(10) Patent No.: US 7,595,623 B2
(45) Date of Patent: Sep. 29, 2009

(54) METHODS AND APPARATUS FOR A SPREAD SPECTRUM SWITCHING REGULATOR

(75) Inventor: Paul T. Bennett, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 403 days.

(21) Appl. No.: 11/603,409

(22) Filed: Nov. 20, 2006

(65) Prior Publication Data

US 2008/0136395 A1    Jun. 12, 2008

(51) Int. Cl.
*G05F 1/40* (2006.01)
(52) U.S. Cl. .................................. 323/288; 323/283
(58) Field of Classification Search ................ 323/222, 323/225, 282–290
See application file for complete search history.

(56) References Cited

U.S. PATENT DOCUMENTS

| 4,806,842 | A | * | 2/1989 | Bittner ..................... 323/222 |
| 5,170,333 | A | | 12/1992 | Niwayama |
| 5,825,165 | A | | 10/1998 | Kitching et al. |
| 5,929,620 | A | | 7/1999 | Dobkin et al. |
| 5,959,443 | A | | 9/1999 | Littlefield |
| 6,215,288 | B1 | | 4/2001 | Ramsey et al. |
| 6,232,755 | B1 | * | 5/2001 | Zhang ..................... 323/282 |
| 6,573,695 | B2 | | 6/2003 | Shahaoua |
| 2004/0012376 | A1 | | 1/2004 | Taghizadeh-Kaschani |
| 2004/0027104 | A1 | | 2/2004 | Ishii et al. |

* cited by examiner

*Primary Examiner*—Jessica Han
(74) *Attorney, Agent, or Firm*—Ingrassia, Fisher & Lorenz, P.C.

(57) ABSTRACT

A spread spectrum switching regulator generally includes an reactive circuit portion coupled to the input terminal, a switching element coupled to the reactive circuit portion, and a control circuit portion coupled between the switching element and the output terminal. The switching element has a drive signal characterized by a duty cycle, and the reactive circuitry portion is configured to produce an output voltage at the output terminal responsive to the duty cycle of the drive signal. The control circuit portion is configured to spread the input power across multiple frequencies by adjusting the drive signal of the switching element, thereby reducing input current noise through spread spectrum techniques. The drive signal is responsive to a pseudo-randomly generated ramp signal.

20 Claims, 4 Drawing Sheets

METHODS AND APPARATUS FOR A SPREAD SPECTRUM SWITCHING REGULATOR

TECHNICAL FIELD

The present invention generally relates to switching regulators, and more particularly relates to methods and apparatus for reducing noise in switching regulators.

BACKGROUND

Switching regulators have achieved wide popularity in recent years due to the need for efficient DC-to-DC power conversion in many applications. Such switching regulators include, for example, buck regulators, boost regulators, buck-boost regulators, and the like.

In general, switching regulators operate by switching a reactive circuit "on" and "off" in such a way that energy from the input voltage source is transferred to the output load with a minimal loss of energy while converting the input voltage to a different output voltage. The resulting output voltage is then a function of the duty cycle of the switching signal, and may be less than the input voltage (buck regulator), greater than the input voltage (boost regulator), an inverse polarity of the input voltage (buck-boost), or a combination thereof.

Currently known switching regulators are unsatisfactory in a number of respects. For example, because such circuits involve fast switching of current ("input current") through an inductive element, a significant amount of noise or electro-mechanical interference (EMI) is often generated by the circuit. While various filters may be incorporated to reduce this noise, such filters are only partially effective, and can add significant cost and size to the system.

Accordingly, it is desirable to provide switching regulators with reduced input current noise. Other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the various embodiments may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the scope or application of possible embodiments. Furthermore, there is no intention to be bound by any expressed or implied theory presented in the preceding technical field, background, brief summary or the following detailed description.

Various embodiments may be described herein in terms of functional and/or logical block components and various processing steps. It should be appreciated that such block components may be realized by any number of hardware, software, and/or firmware components configured to perform the specified functions. For the sake of brevity, conventional techniques and circuitry related to switching regulators and other standard switching components have not been described in detail.

In general, a spread spectrum switching regulator (e.g., a boost regulator, buck regulator, or the like), as described below, includes control circuitry configured to adjust the drive signal of a switching element by modulating the frequency and/or the slope of a ramp signal used in the feedback loop. The ramp signal is modulated (e.g., randomly) such that the switching regulator's input power signal (e.g., the product of input current and input voltage) is spread across multiple frequencies. Or, stated another way, the power distribution at the input terminal includes multiple frequencies. In this way, spread spectrum techniques are used to spread out and reduce the peak conducted input noise of the regulator.

Figure 1:
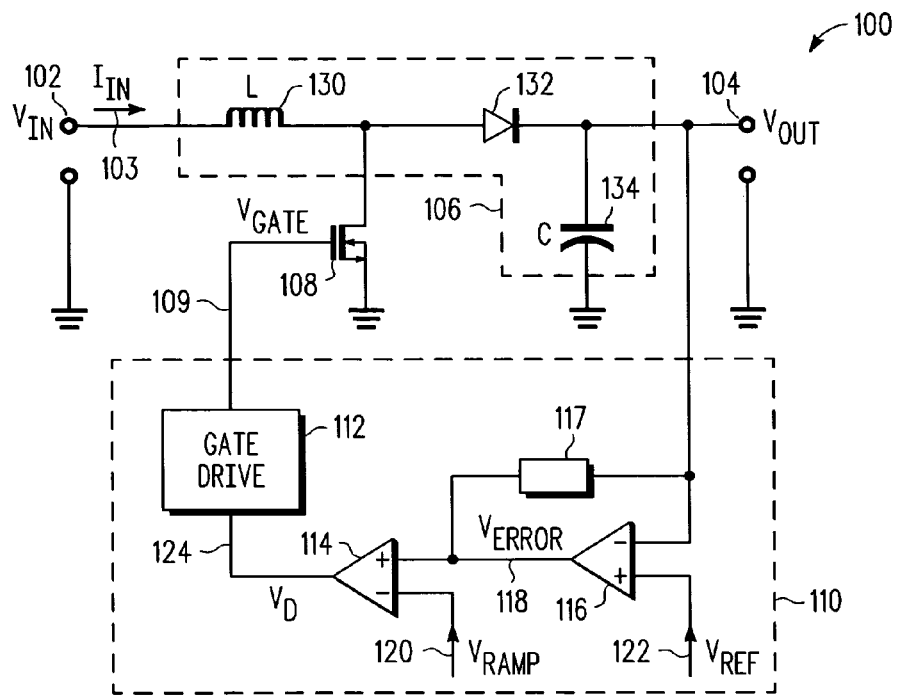
FIG. 1 is an schematic diagram of a boost switching regulator useful in illustrating various embodiments.

Referring to FIG. 1, a spread spectrum switching regulator ("switching regulator," or simply "regulator") 100 in accordance with one embodiment is configured as a boost regulator—i.e., a DC-to-DC converter that has an output voltage at output terminal 104 that is greater than the input voltage at input terminal 102. It will be understood, however, that various other types of switching regulators may be implemented—for example, buck regulators, buck-boost regulators, flyback regulators, push-pull regulators, half-bridge regulators, full-bridge regulators, and the like. Furthermore, a variety of additional components such as filters, controllers, and the like might be included in any particular implementation. Such conventional components are, for the purposes of clarity, not included in this figure.

Switching regulator 100 includes a reactive circuit portion 106 coupled to input terminal 102, a switching element 108 coupled to reactive circuit portion 106, and a control circuit portion 110 coupled between switching element 108 (e.g., the gate of a field-effect transistor (FET) as illustrated) and output terminal 104. An associated input current 103 (which in this embodiment is equal to the current through inductor 130) is produced during switching, as described in further detail below. An input power is associated within input current 103 and the input voltage at terminal 102, as is known in the art.

Reactive circuit portion (or simply "circuit") 106 may include any number of passive and/or active components configured to produce the desired regulator output. The phrase "reactive circuit portion" as used herein refers to any combination of passive and/or active components that includes at least one capacitive or inductive element, as that term is used in the art. In the illustrated embodiment, for example, reactive circuit portion 106 is configured to implement a boost regulator, and thus includes an inductive element (or simply "inductor") 130 in series with a diode element (or "diode") 132 between input terminal 102 and output terminal 104, as well as a capacitive element (or "capacitor") 134 coupled between output terminal 104 and ground. The drain of FET 108 is coupled between diode 132 and inductor 130 such that the current flow through reactive circuit portion 106 may be switched as described in detail below.

Switching element 108 includes any suitable switching device, such as a MOSFET or bipolar junction transistor. Without loss of generality, switching element 108 will often be referred to below simply as a FET having a conventional gate. It will be understood, however, that this does not limit the range of components that may be used for switching element 108.

Control circuit portion (or simply "control circuit") 110 includes any number of components configured to provide an appropriately modulated signal 109 to the gate of FET 108. In accordance with one embodiment, control circuit 110 is configured to spread the input power across multiple frequencies by adjusting the pulsed gate signal 109.

More particularly, in the illustrated embodiment, control circuit 110 includes an operational amplifier (or "op-amp") 116 that compares the output voltage ($V_{out}$) at output terminal 104 to a suitable reference voltage ($V_{ref}$) 122 (e.g., a 1.2V bandgap reference, as is known in the art). Op-amp 116 produces an error signal ($V_{error}$) 118 that feeds into an input of a comparator 114. Op-amp 116 will typically include some form of feedback component 117 (e.g., one or more passive components such as capacitors, resistors, etc.). Such feedback components are well known in the art.

Comparator 114 compares error signal 118 to a ramp signal 120 (described in further detail below) to produce a drive signal ($V_d$) 124. Drive signal 124 is processed through a gate drive component 112 such that it is suitable as a gate input 109 to FET 108. Conventional gate drive components 112 are known in the art, and need not be described herein.

The nature of ramp signal 120 largely controls drive signal 124, and thus the behavior of switching regulator circuit 100. The ratio of the output voltage to the input voltage is a function of the duty cycle of gate signal 109, which is defined as the on-time of the signal divided by the sum of the on-time and off-time of the signal. Gate signal 109 is a series of pulses—also referred to as a pulse-width modulation (PWM) signal—whose frequency and shape are determined by the difference between ramp signal 120 and error signal 118. That is, referring to the graph shown in FIG. 2, the ramp signal 120 increases linearly to a maximum then drops back quickly to a minimum level as shown, such that signal 120 is characterized by a frequency (the inverse of the period between peaks), and a slope 206. The error signal 118 has an average steady state voltage value between the minimum and maximum values of ramp signal 120. As a result, comparator 114 produces a pulse during an "on" state 202 when the value of $V_{ramp}$ is below $V_{error}$, and is in an "off" state 204 when $V_{ramp}$ is greater than $V_{error}$.

Referring again to FIG. 1, FET 108 turns on and off in response to the pulses received via gate signal 109. When FET 108 is on (conducting), current flows through inductor 130 to ground. The inductor current increases in a linear fashion. When FET 108 is off, however, the inductor current decreases, forward-biasing diode 132, and charging capacitor 134 to a value that is higher than the input voltage. The input current 103 exhibits a triangular waveform as it increase and decreases during operation. Switching of inductor current in this manner can result in significant noise (peak conducted input noise) and EMI, which will tend to be centered at the switching frequency.

The value of $V_{out}$ is a function of, among other things, the duty cycle of gate signal 109. The greater the duty cycle, the greater the output voltage. Control circuit 110 provides a feedback loop to maintain the output voltage at a substantially constant value.

Figure 3:
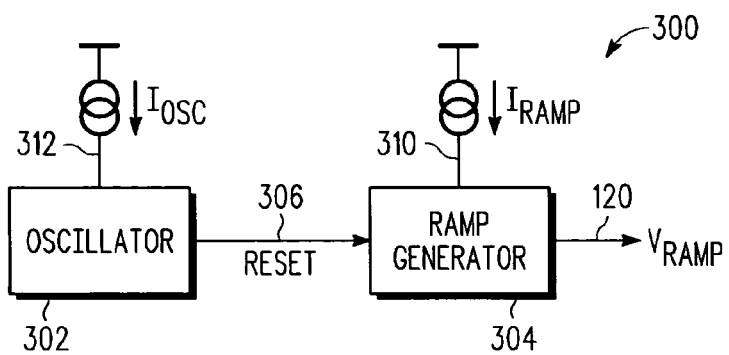
FIG. 3 is a conceptual block diagram of a ramp generator and oscillator in accordance with one embodiment.

FIG. 3 is a schematic block diagram of one embodiment of a circuit 300 for generating a ramp signal 120. As shown, circuit 300 includes an oscillator 302 and ramp generator 304, wherein oscillator 302 communicates with ramp generator 304 through a reset signal (or "oscillator signal") 306. An oscillator current source 312 is coupled to oscillator 302, and a ramp current source 310 is coupled to ramp generator 304. Oscillator 302 is configured to produce a signal 306 (a "reset signal") that is a function of (e.g., proportional to) current source 312. As mentioned above, the ramp slope and/or the oscillator frequency are modulated to adjust the drive signal supplied to the switching element (108 in FIG. 1).

Figure 2:
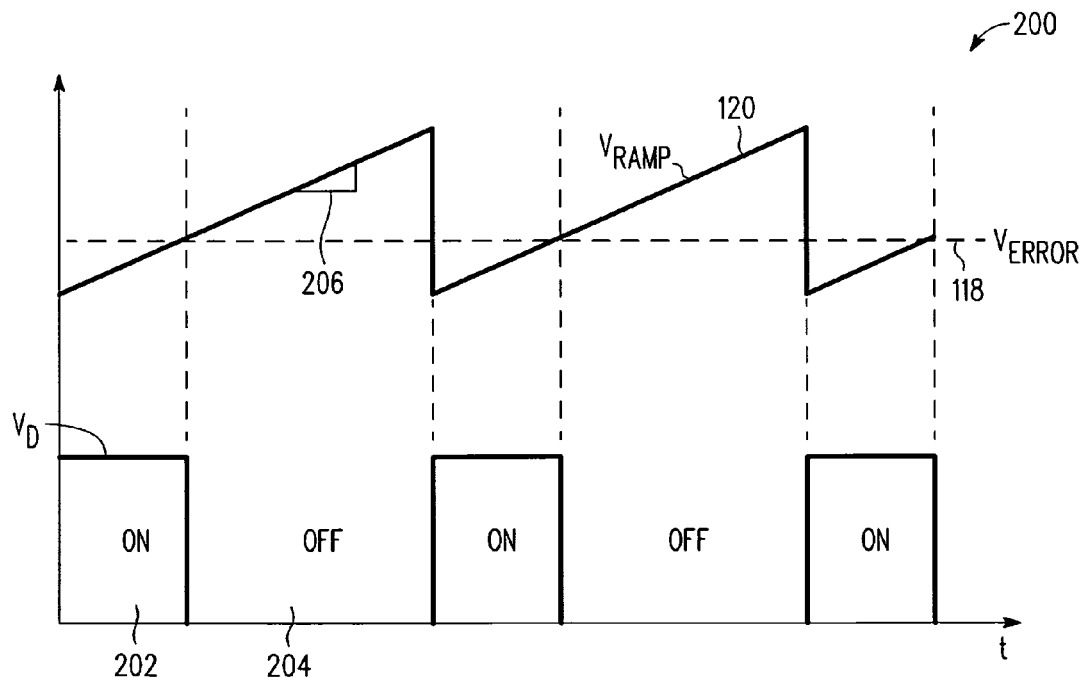
FIG. 2 is a graph showing an exemplary ramp voltage signal during switching regulator operation.

Ramp generator 304 is configured to produce a ramp signal having a ramp slope (as shown in FIG. 2) at a frequency determined via reset signal 306. The ramp slope and oscillator may be modulated simultaneously and randomly to a state selected from a set of discrete states. That is, the regulator may have a predefined set of ramp slopes and frequencies from which the system selects during operation to achieve the desired frequency distribution of the input power.

Figure 4:
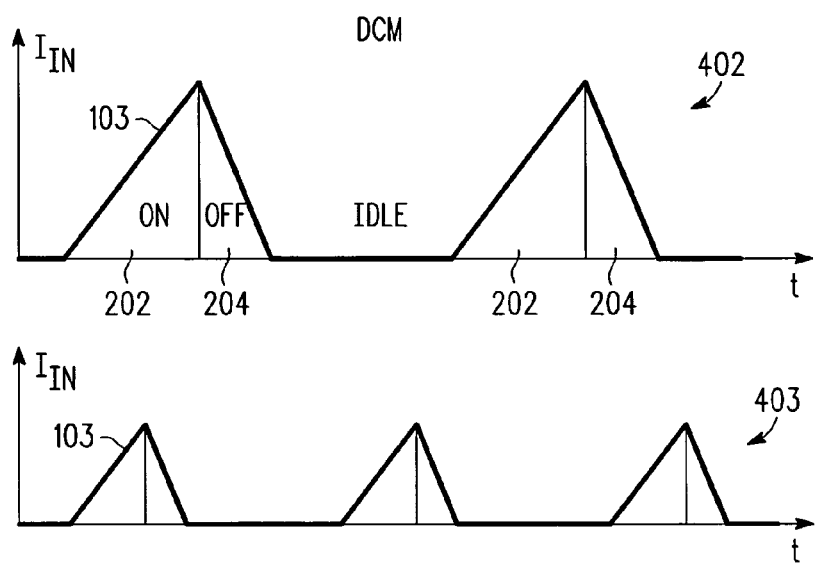
FIG. 4 is a graph showing input current waveforms corresponding to discontinuous mode (DCM) operation of a boost regulator.

In one embodiment, wherein the switching regulator is configured to operate in a discontinuous mode (DCM), the oscillator frequency and ramp slope are modulated such that the ramp slope is adjusted to accommodate changes in oscillator frequency. The input current waveform for such a case is shown in FIG. 4. As shown in graph 402, input current 103 rises during "on" state 202, then falls (at a higher rate) to zero current flow at the end of the "off" state 204, whereupon it enters an "idle" state. Graph 403 shows the result of changing the ramp slope as well as the oscillator frequency. As shown, the slope (and peak current) varies from that shown in graph 402. In a particular embodiment, the ramp slope is adjusted such that it remains substantially proportional to the square root of the oscillator frequency. In this embodiment, the duty cycle of the gate drive will also typically change as the frequency of the oscillator is modulated.

Figure 5:
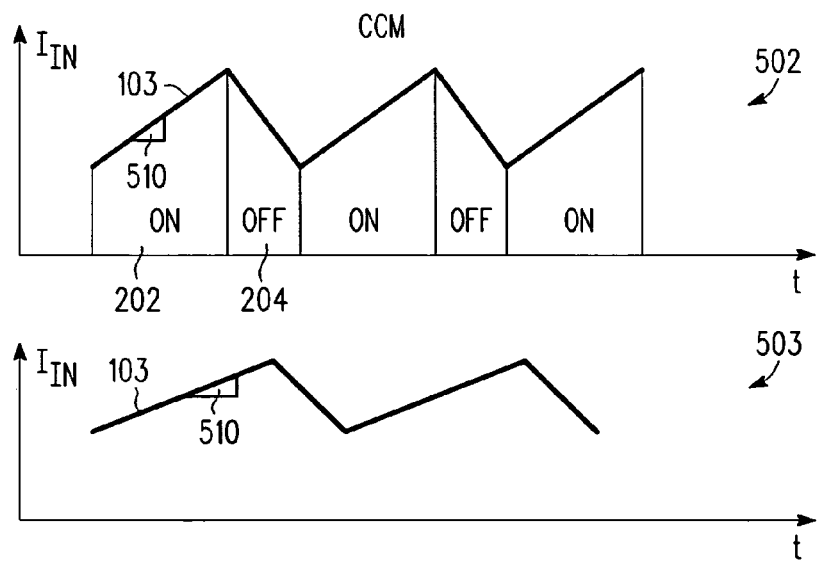
FIG. 5 is a graph showing input current waveforms corresponding to continuous mode (CCM) operation of a boost regulator.

In another embodiment, wherein the switching regulator is configured to operate in a continuous mode (CCM) and the input current does not drop to zero, the ramp slope and oscillator frequency are adjusted such that the duty cycle of the switching element remains substantially constant, while still correcting for and adjusting for minor variations in the output voltage resulting from, for example, changes in output load conditions and/or changes in input voltage. FIG. 5 shows an example of a CCM application. Specifically, the input current 103 rises at a constant slope 510 during "on" state 202, then falls at a constant slope during "off" state 204, as shown in graph 502. The value of input current 103 does not drop to zero, in contrast to the DCM case illustrated in FIG. 4. When the frequency of the oscillator is changed, as shown in graph 503, the slope 510 is also changed to maintain the duty cycle. The computation of slopes, frequency, and duty cycle may be performed in any convenient matter in accordance with known principles.

Figure 6:
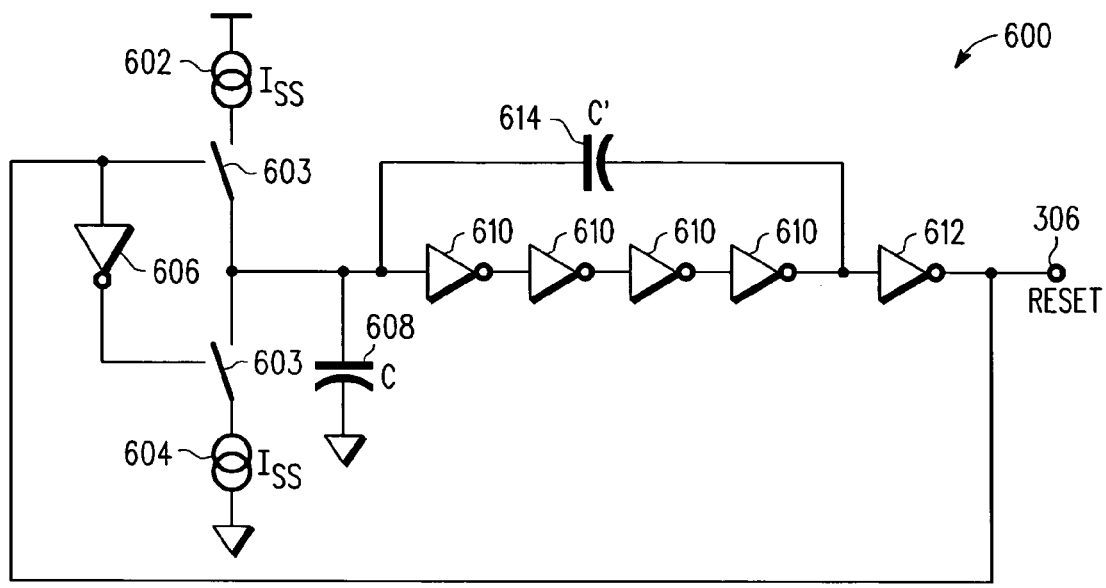
FIG. 6 depicts an exemplary oscillator circuit.
Figure 7:
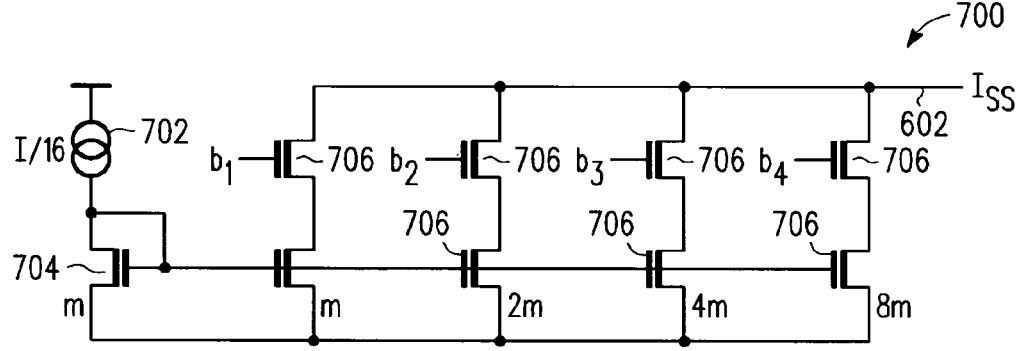
FIG. 7 depicts a frequency selection circuit for use in conjunction with the oscillator circuit shown in FIG. 6.

Oscillator circuit 302 and ramp generator 304 may include any combination of hardware, software, and firmware capable of generating ramp signals with adjustable slope and frequency. Any number of conventional circuit designs may be used to accomplish this task. FIGS. 6 and 7, for example, depict portions of an exemplary oscillator circuit 302 (600 and 700). That is, $I_{SS}$ output 602 of FIG. 7 corresponds to $I_{SS}$ 602 in FIG. 6. $I_{SS}$ 604 is preferably a reflection current 602 produced using, for example, a p-channel mirror (not shown).

As shown, circuit 600 includes a current source 602 ($I_{SS}$), an inverter 606, a pair of associated switches 603, a capacitor 608 leading to ground, and a series of inverters 610, 612 and capacitor 614 configured in a conventional ring oscillator topology. The output reset signal 306 is proportional to the value of $I_{SS}$ 602, 604, and is inversely proportional to the capacitance of capacitor 614.

A circuit as shown in FIG. 7 is used to select a particular current $I_{SS}$ (and thus a particular frequency), and includes a current source 702, a FET 704, and a series of switches 706 used to select a particular frequency by turning on one or more of switches (e.g. MOSFETS) 706. In this embodiment, with four bits, a set of sixteen different current levels are available. It will be appreciated that any particular current resolution may be provided by increasing or decreasing the number of control bits (and switches 706). The frequency may be selected in a pseudo-random fashion by choosing a pseudo-random binary sequence.

Figure 9:
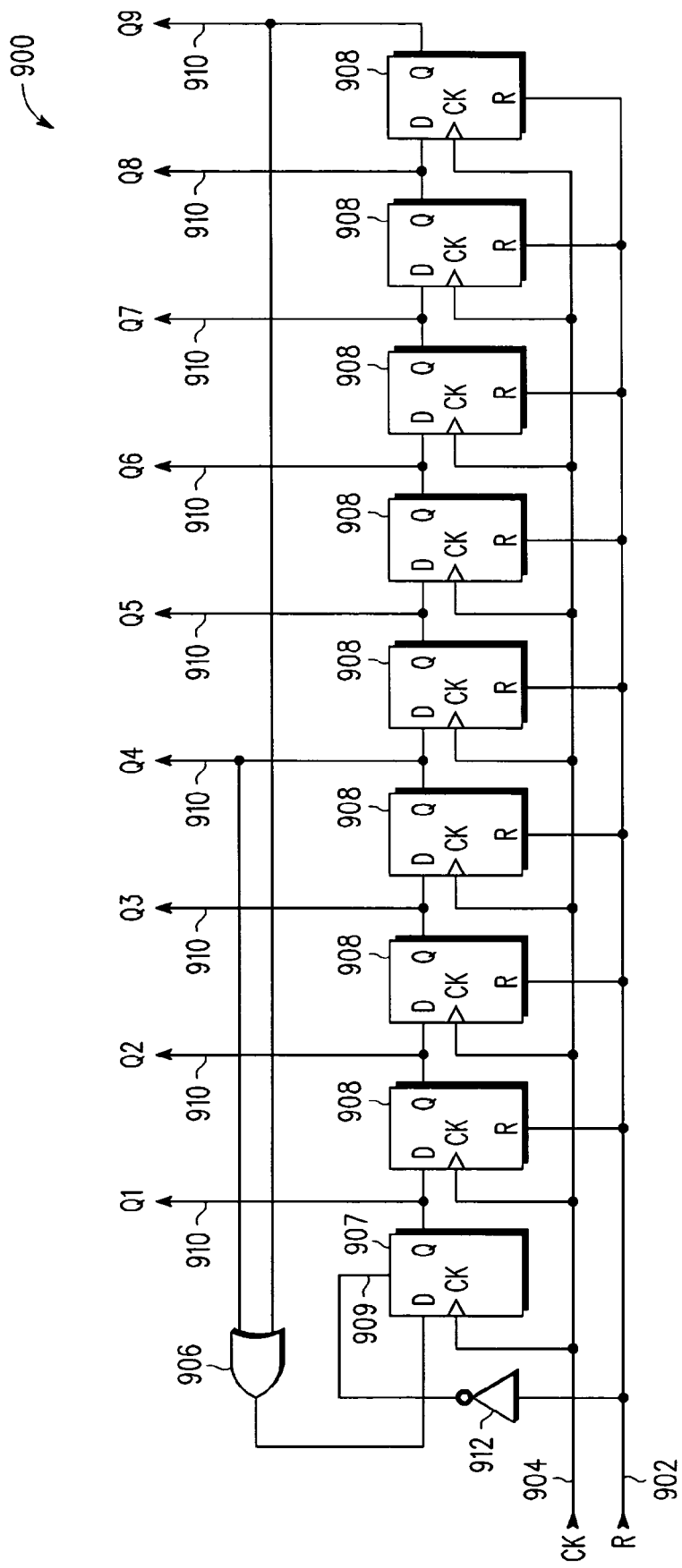
FIG. 9 depicts an example pseudo-random number generator.

FIG. 9 shows an exemplary pseudo-random number generator circuit 900 that may be used in conjunction with the oscillator circuit 302 collectively depicted in FIGS. 6 and 7. Circuit 900 includes a series of D flip-flops 907, 908, each having respective "Q" outputs coupled to the subsequent "D" inputs. This embodiment includes nine such flip-flops, but any number may be used. Each flip flop 908 is coupled to a common clock signal 904 and reset signal 902. The active low set "SB" pin 909 of foremost flip flop 907 is coupled to reset signal 902 via an inverter 912. A set of nine outputs 910 (Q1-Q9) are produced. Outputs Q4 and Q9 are connected to an XOR gate 906, which leads to the "D" input of flip-flop 907.

The illustrated configuration of serial D flip-flops produces a digital pattern that repeats every $2^9$ (512) cycles. While this is not a random sequence, the outputs Q1-Q4 together produce 16 binary numbers that cycle quickly enough that the result may be considered "pseudo-random." It is these four outputs Q1-Q4 that correspond to bits b1-b4 illustrated in FIG. 7 (i.e., the gates of MOSFETs 706). By using the pseudo-random number generator of FIG. 9 to pseudo-randomly drive b1-b4 of the circuit shown in FIG. 7, respective $I_{SS}$ values 602 (16 total) are produced. This $I_{SS}$ value 602 is used as the input to the circuit shown in FIG. 6, which, because of the proportionate relationship between $I_{SS}$ and frequency of reset signal 306, thereby controls the frequency of the generated ramp signal.

Figure 8:
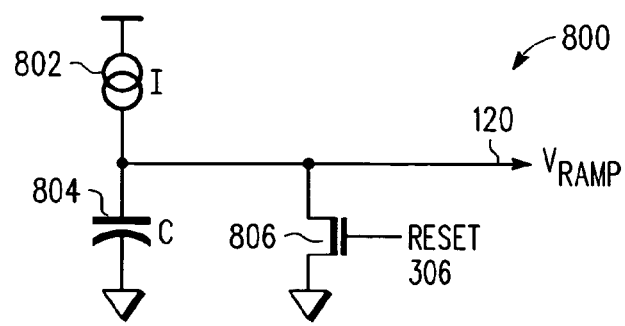
FIG. 8 depicts an exemplary ramp generator circuit in simplified form.

FIG. 8 depicts an exemplary ramp generator circuit 800 in simplified form. Circuit 800 includes a current source 802, a capacitor 804, and a switch 806 that is responsive to the reset signal 306 received from oscillator 302. The frequency of ramp signal 120 is determined by the frequency of the reset signal 306, described above. Because of the repeated charging and discharging of capacitor 804, and the fundamental relationship between voltage and current through capacitor 804 ($i = C \cdot dv/dt$) the slope (dv/dt) of ramp signal 120 is determined by the value I of current source 802. The value of current source 802 may be specified by using a circuit such as shown in FIG. 7 in combination with a pseudo-random number generator as shown in FIG. 9.

As described above, in the CCM case, the slope of ramp signal 120 is adjusted to produce a consistent duty cycle— i.e., the slope is increased as the frequency is increased. In the DCM case, however, the slope is adjusted such that it remains proportional to the square root of the frequency. Circuit designs capable of computing the square root of a signal are well known in the art, and need not be described herein.

In summary, what has been described is a spread spectrum switching regulator having an input terminal and an output terminal, the switching regulator comprising: a reactive circuit portion coupled to the input terminal; a switching element coupled to the reactive circuit portion, the switching element configured to accept a drive signal having a duty cycle and to effect switching of the reactive circuit portion to produce an output voltage at the output terminal responsive to the duty cycle; and a control circuit portion coupled between the switching element and the output terminal, the control circuit portion configured to produce a ramp signal having a selectable frequency and a selectable ramp slope, and to adjust the drive signal in accordance with the ramp signal.

In one embodiment, the control circuit portion further includes a pseudo-random number generator configured to pseudo-randomly select the frequency. The reactive circuit portion may be characterized by an input power, wherein the control circuit portion is configured to select the frequency and the ramp slope such that the input power is spread across multiple frequencies.

In one embodiment, the switching regulator is configured to operate in a continuous mode (CCM), wherein the ramp slope and frequency are selected such that the duty cycle of the switching element remains substantially constant. In another, the switching regulator is configured to operate in a discontinuous mode (DCM), wherein the ramp slope and the frequency are selected such that the ramp slope remains substantially proportional to the square root of the frequency. The control circuit may include an oscillator configured to produce the selectable frequency, and a ramp generator configured to produce the selectable ramp slope. The control circuit portion may further include a comparator configured to compare the ramp signal and an error signal to produce the drive signal. In one embodiment, the control circuit portion further includes an operational amplifier configured to compare the output voltage with a reference voltage to produce the error signal. In another embodiment, the reactive circuit portion is configured such that the output voltage is less than the input voltage. The reactive circuit portion may be configured such that the output voltage is greater than the input voltage.

In a particular embodiment, the reactive circuit portion includes: an inductive element coupled between the input terminal and a first node, wherein the first node is coupled to the switching element; a diode element coupled between the first node and the output terminal; and a capacitive element coupled between the output voltage and a ground node.

A method for reducing noise in a switching regulator of the type having an input terminal, an output terminal, and an reactive circuit portion coupled to the input terminal, wherein the reactive circuit portion has an input voltage and an input power, comprises: providing a switching element coupled to the reactive circuit portion, the switching element configured to accept a drive signal having a duty cycle; providing a control circuit portion between the switching element and the output terminal; generating a ramp signal having a frequency and a ramp slope; generating the drive signal by comparing the ramp signal to an error signal, wherein the error signal is based on the difference between the output voltage and a reference voltage.

In one embodiment, generating the ramp signal includes generating a pseudo-random ramp frequency. In another, the duty cycle of the switching element remains substantially constant during the step of generating the drive signal. During step of generating the ramp signal, the ramp slope may remain substantially proportional to the square root of the ramp frequency. Generating the ramp signal may include modulating the ramp slope pseudo-randomly.

A spread spectrum boost regulator generally includes: an input terminal; an output terminal; a reactive circuit portion coupled to the input terminal, the reactive circuit portion including an inductive element coupled between the input terminal and a first node, a diode element coupled between the first node and the output terminal, and a capacitive element coupled between the output voltage and a ground node; a switching element coupled to the first node, the switching element responsive to a drive signal having a duty cycle, wherein the reactive circuitry portion is configured to produce, in response to the duty cycle of the drive signal; the output voltage; and a control circuit portion coupled between the switching element and the output terminal, the control circuit including an oscillator coupled to a ramp generator, wherein the oscillator is configured to produce an oscillator signal having an oscillator frequency, and the ramp generator is configured to produce a ramp signal having a ramp slope at the oscillator frequency, and wherein the ramp slope and the oscillator frequency may be pseudo-randomly selected to adjust the drive signal.

In one embodiment, the control circuit portion further includes a comparator configured to compare the ramp signal and an error signal to produce the drive signal. In another, the control circuit portion further includes an operational amplifier configured to compare the output voltage with a reference voltage to produce the error signal. The ramp slope may be selected such that it remains substantially proportional to the square root of the oscillator frequency.

While at least one example embodiment has been presented in the foregoing detailed description, it should be appreciated that a vast number of variations exist. It should also be appreciated that the example embodiment or embodiments described herein are not intended to limit the scope, applicability, or configuration of the various embodiments in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A spread spectrum switching regulator having an input terminal and an output terminal, the switching regulator comprising:
    a reactive circuit portion coupled to the input terminal;
    a switching element coupled to the reactive circuit portion, the switching element configured to accept a drive signal having a duty cycle and to effect switching of the reactive circuit portion to produce an output voltage at the output terminal responsive to the duty cycle; and
    a control circuit portion coupled between the switching element and the output terminal, the control circuit portion configured to adjust the drive signal in accordance with a ramp signal; and
    a ramp generator coupled to the control circuit portion, wherein the ramp generator is configured to produce the ramp signal with a ramp slope and a frequency that is pseudo-randomly selected.

2. The switching regulator of claim 1, wherein the switching regulator is configured to operate in a continuous mode (CCM), and wherein the ramp slope and frequency are selected such that the duty cycle of the switching element remains substantially constant.

3. The switching regulator of claim 1, wherein the control circuit includes an oscillator configured to produce the selectable frequency, and the ramp generator configured to produce the selectable ramp slope.

4. The regulator of claim 1, wherein the control circuit portion further includes a comparator configured to compare the ramp signal and an error signal to produce the drive signal.

5. The regulator of claim 4, wherein the control circuit portion further includes an operational amplifier configured to compare the output voltage with a reference voltage to produce the error signal.

6. The regulator of claim 1, wherein the reactive circuit portion is configured such that the output voltage is less than the input voltage.

7. The regulator of claim 1, wherein the reactive circuit portion is configured such that the output voltage is greater than the input voltage.

8. The regulator of claim 7, wherein the reactive circuit portion includes:
    an inductive element coupled between the input terminal and a first node, wherein the first node is coupled to the switching element;
    a diode element coupled between the first node and the output terminal; and
    a capacitive element coupled between the output voltage and a ground node.

9. A spread spectrum switching regulator having an input terminal and an output terminal, the switching regulator comprising:
    a reactive circuit portion coupled to the input terminal;
    a switching element coupled to the reactive circuit portion, the switching element configured to accept a drive signal having a duty cycle and to effect switching of the reactive circuit portion to produce an output voltage at the output terminal responsive to the duty cycle; and
    a control circuit portion coupled between the switching element and the output terminal, the control circuit portion configured to produce a ramp signal having a selectable frequency and a selectable ramp slope, and to adjust the drive signal in accordance with the ramp signal, wherein the control circuit portion further includes a pseudo-random number generator configured to pseudo-randomly select the frequency.

10. The switching regulator of claim 9, wherein the reactive circuit portion is characterized by an input power, and wherein the control circuit portion is configured to select the frequency and the ramp slope such that the input power is spread across multiple frequencies.

11. A spread spectrum switching regulator having an input terminal and an output terminal, the switching regulator comprising:
    a reactive circuit portion coupled to the input terminal;
    a switching element coupled to the reactive circuit portion, the switching element configured to accept a drive signal having a duty cycle and to effect switching of the reactive circuit portion to produce an output voltage at the output terminal responsive to the duty cycle; and
    a control circuit portion coupled between the switching element and the output terminal, the control circuit portion configured to produce a ramp signal having a selectable frequency and a selectable ramp slope, and to adjust the drive signal in accordance with the ramp signal, wherein the switching regulator is configured to operate in a discontinuous mode (DCM), and wherein the ramp slope and the frequency are selected such that the ramp slope remains substantially proportional to the square root of the frequency.

12. A method for reducing noise in a switching regulator of the type having an input terminal, an output terminal, and an reactive circuit portion coupled to the input terminal, wherein the reactive circuit portion has an input voltage and an input power, the method comprising:

provide a switching element coupled to the reactive circuit portion, the switching element configured to accept a drive signal having a duty cycle;

providing a control circuit portion between the switching element and the output terminal;

generating a ramp signal having a pseudo-randomly selected frequency and a ramp slope; and generating the drive signal by comparing the ramp signal to an error signal, wherein the error signal is based on the difference between the output voltage and a reference voltage.

13. The method of claim 12, wherein, during step of generating the ramp signal, the ramp slope remains substantially proportional to the square root of the ramp frequency.

14. The method of claim 12, wherein generating the ramp signal includes modulating the ramp slope pseudo-randomly.

15. A method for reducing noise in a switching regulator of the type having an input terminal, an output terminal, and an reactive circuit portion coupled to the input terminal, wherein the reactive circuit portion has an input voltage and an input power, the method comprising:

providing a switching element coupled to the reactive circuit portion, the switching element configured to accept a drive signal having a duty cycle;

providing a control circuit portion between the switching element and the output terminal;

generating a ramp signal having a frequency and a ramp slope, wherein generating the ramp signal includes generating a pseudo-random ramp frequency; and generating the drive signal by comparing the ramp signal to an error signal, wherein the error signal is based on the difference between the output voltage and a reference voltage.

16. The method of claim 15, wherein the duty cycle of the switching element remains substantially constant during the step of generating the drive signal.

17. A spread spectrum boost regulator comprising:

an input terminal;

an output terminal;

an reactive circuit portion coupled to the input terminal, the reactive circuit portion including an inductive element coupled between the input terminal and a first node, a diode element coupled between the first node and the output terminal, and a capacitive element coupled between the output voltage and a ground node;

a switching element coupled to the first node, the switching element responsive to a drive signal having a duty cycle, wherein the reactive circuitry portion is configured to produce, in response to the duty cycle of the drive signal; the output voltage;

a control circuit portion coupled between the switching element and the output terminal, the control circuit including an oscillator coupled to a ramp generator, wherein the oscillator is configured to produce an oscillator signal having an oscillator frequency, and the ramp generator is configured to produce a ramp signal having a ramp slope at the oscillator frequency, and wherein the ramp slope and the oscillator frequency may be pseudo-randomly selected to adjust the drive signal.

18. The regulator of claim 17, wherein the control circuit portion further includes a comparator configured to compare the ramp signal and an error signal to produce the drive signal.

19. The regulator of claim 18, wherein the control circuit portion further includes an operational amplifier configured to compare the output voltage with a reference voltage to produce the error signal.

20. The switching regulator of claim 19, wherein the ramp slope is selected such that it remains substantially proportional to the square root of the oscillator frequency.

* * * * *